United States Patent [19]
Engel et al.

[11] Patent Number: 5,781,172
[45] Date of Patent: Jul. 14, 1998

[54] DATA INPUT DEVICE FOR USE WITH A DATA PROCESSING APPARATUS AND A DATA PROCESSING APPARATUS PROVIDED WITH SUCH A DEVICE

[75] Inventors: Frederik L. Engel; Reinder Haakma; Jozeph P. M. Van Itegem, all of Eindhoven, Netherlands

[73] Assignee: U.S. Philips Corporation, New York, N.Y.

[21] Appl. No.: 876,829

[22] Filed: Jun. 16, 1997

Related U.S. Application Data

[63] Continuation of Ser. No. 678,115, Jul. 10, 1996, abandoned, which is a continuation of Ser. No. 415,779, Apr. 3, 1995, abandoned, which is a continuation of Ser. No. 136,477, Oct. 13, 1993, abandoned, which is a continuation of Ser. No. 803,258, Dec. 5, 1991, abandoned.

[30] Foreign Application Priority Data

Dec. 5, 1990 [NL] Netherlands .............. 9002669

[51] Int. Cl.⁶ ...................................... G09G 5/08
[52] U.S. Cl. ...................................... 345/164; 345/157
[58] Field of Search ......................... 340/706, 709, 340/710; 74/471 XY, 471 R; 188/162, 163, 164; 273/148 B, DIG. 28; 345/156, 157, 167, 164, 165

[56] References Cited

U.S. PATENT DOCUMENTS

| 4,493,992 | 1/1985 | Geller ........................ 340/709 |
| 4,868,549 | 9/1989 | Affinito et al. ............... 340/709 |
| 4,881,065 | 11/1989 | Soma et al. ................. 340/710 |
| 4,952,081 | 8/1990 | Hedtke ....................... 318/6 |

OTHER PUBLICATIONS

NTIS Tech Notes, May 1990, p. 413 "Force Feedback Cursor Control" B. Hanhah.

Proceedings of the IEEE Intern. Conf. on Robotics and Automation, vol. 1, pp. 584–589 "Experimental and Simulation Studies" B. Hannaford et al, 1988.

*Primary Examiner*—Chanh Nguyen

[57] ABSTRACT

A joystick, mouse, or trackball having a rotationally-symmetrical member. The joystick or the like can be braked by an appropriate control signal from a data processing apparatus such as a computer. Mechanical feedback to the operator is thus realized. In accordance with the invention, the joystick, mouse or trackball also includes an accelerator which is capable of positively accelerating the joystick, mouse or trackball in a desired direction. The mechanical feedback is thus substantially improved.

29 Claims, 2 Drawing Sheets

DATA INPUT DEVICE FOR USE WITH A DATA PROCESSING APPARATUS AND A DATA PROCESSING APPARATUS PROVIDED WITH SUCH A DEVICE

This is a continuation of application Ser. No. 08/678,115, filed Jul. 10, 1996, now abandoned which is a continuation of application Ser. No. 08/415,779, filed Apr. 3, 1995, now abandoned which is a continuation of Ser. No. 08/136,477, filed Oct. 13, 1993, now abandoned which is a continuation of Ser. No. 07/803,258, filed Dec. 5, 1991 now abandoned.

BACKGROUND OF THE INVENTION

1. Field of the Invention

The invention relates to a data input device for use with a data processing apparatus, the device comprising a housing that contains a physical member having at least one axis of rotational symmetry and allowing rotational manipulation around any axis with respect to the housing, the device having a sensor for upon the manipulation feeding a sensing signal to the data processing apparatus for thereupon moving a display indicium according to an aggregation of the manipulation on a display. The device includes a controller in response to the sensing signal braking the rotational manipulation. One general realization is as a so-called graphical input device, colloquially called mouse or trackball, which is used to enter commands to a data processing computer or the like. The commands could relate to effecting cursor motions, where activating the cursor at a predetermined position would initiate or stop a specific computer action. Various other user interface features of such a device have been in use. The physical member may have a single axis of rotational symmetry, such as a cylinder. This can likewise be used in the context of a computer. The data processing apparatus may form part of a user appliance not specifically devoted to the data processing per se, such as a radio broadcast tuner. The rotating cylinder could then activate shifting the actually receiving frequency through a prespecified frequency band. Now, although the principal application of the invention is envisaged with a digital data processing apparatus, it may as well be used with apparatus based on analog signalization, such as the above radio broadcast tuner. For brevity, reference is generally had to a data processing apparatus.

2. Description of the Related Art

For use with a computer, a two-dimensional device of this kind is known from U.S. Pat. No. 4,868,549 (Affinito et al.). The reference describes a mouse for use in a video display system, for example a personal computer (PC). The mouse serves for the input of coordinates into the system, thus enabling a cursor to be moved across a display screen of the video system. The mouse housing comprises a sphere which performs a rotary motion when the mouse is moved by hand. Via two wheels which are in mechanical contact with the sphere and which are arranged at an angle of 90° with respect to one another, a motion of the mouse can be detected and measured in an x-direction as well as a y-direction by rotation of the wheels. Motion sensors are coupled to the shafts of the wheels, thus enabling a motion of the wheels to be transferred to the video system.

The mouse disclosed in the reference also comprises braking means enabling the braking of the wheel in the x-direction as well in the y-direction during motion of the wheels. The motion of the mouse can thus be hampered in a given direction by introduction of a friction which may be greater or smaller in a given direction. In addition to a customary visual feedback (for example, the position of a cursor on an image display screen), the operator also experiences a resistive mechanical feedback by the frictional force on the mouse. The inventors of the present invention have discovered that the feedback effected on the rotational manipulation of the device can be made more sophisticated, thereby allowing a wider range of useful applications.

SUMMARY OF THE INVENTION

Amongst other things it is an object of the present invention to increase the range of feedback functionality, so that the machine-generated force can effect a richer tactility to the data input device. According to a first aspect of the invention the object is realized in that the controller controls both positive and negative accelerations with respect to the rotational manipulation as governed by the data processing apparatus according to a position signal of the display indicium on the display. In this way, also a feed-forward force could be felt by a human user, in addition to, or as an alternative to a braking or negative acceleration force. The positive and negative accelerations may have a fixed value each, such as +A and −B, respectively wherein A and B could be mutually equal or, alternatively, differ from each other. Also, the range of values may be greater. The effective value of the acceleration can depend on where on the screen the indicium, usually the cursor, is actually located. In this respect, the present invention differs from such realizations in remote handling or robotry, where the description of the remote object to be handled would control the feedback. Also, the invention differs from realization pertaining to a data input device on the basis of a joystick or the like. With such joystick, a force extended on the joystick will move it away from a home position, and the physical offset of the joystick so produced is integrated in time to attain the intended movement of an on-screen indicium. Feedback there would be effected as a force exerted on the joystick. In the present invention, any motion of the rotationally symmetric member translates directly to a movement of the on-screen indicium. Therefore, the force is directly dependent on the on-screen position, and in fact, a non-zero force may be present when the position of the indicium is stationary. It would be possible that the indicium be propelled by the system, so that the system would apply kinetic energy to the physical member. This would be unthinkable in the case of a joystick. Generally, the kinematic functionality of a joystick is widely different from that of mouse/trackball devices.

Advantageously the positive and negative accelerations derive from a potential field mapped on display. The potential field can be mapped as a bit pattern or as a set of potential functions. This would allow to realize preferred positions or regions on the display with respect to other positions or regions. The potential may be determined for every pixel or for a subset of all pixels. In the latter case, an operator bit pattern may access the so defined pixels for on the basis of their respective potentials and positions relative to the position of the indicium, calculate an instantaneous sign and value of the acceleration. It would be clear that, for example, motion in an x-direction can now be combined with an acceleration in a y-direction.

Advantageously, the positive and negative accelerations are at least codetermined by an actual velocity of the rotational manipulation. An example would be that during fast motion, the generation of the accelerations is suspended. Only during slow motion, they would be present. This would guide the human user during access of a displayed feature that has fine granularity, for so improving effective dexterity.

Gross movements would not need such assistance. Moreover, the machine generated force and the operator generated force are now mutually uncoupled.

Advantageously the sensor allows for detecting an actual total force on the member in at least one coordinate direction. This feature would greatly improve the flexibility of the feedback mechanism. The detection of such actual total force is by itself a conventional embodiment.

Advantageously the sensor allows for detecting an instantaneous velocity of the member with respect to the housing. Likewise, this feature improves verbability of the data input device and its use. Velocity measurement can be realized in a variety of ways.

Advantageously the accelerations are multivalued. They may have a finite set of values, or even have a continuous range of values. Sometimes a D/A conversion is necessary.

Advantageously, the device is provided with an assignor for assigning to the member a predetermined virtual rotational inertia. Such inertia is represented by an acceleration that adds to the physical inertia. It has proven to be an excellent device for data input, for training, or for testing operators as to their capacities on a motoric level. The inertia need not be time-uniform and/or spatially uniform. A particular advantage of virtual inertia that is greater than actual physical inertia is that the latter now could be made as small as technically feasible. This may be used to construct the physical member as a lightweight element, making it better suitable for portable and/or miniature devices.

In another embodiment, the device may include at least one electromechanical motor for implementing the brake as well as the accelerator. The brake and the accelerator can be simply implemented by way of electromechanical motors. The motor can be accelerated by application of an excitation current, but it is also possible for the motor to be braked. This depends on the excitation current itself (for example, a positive or negative excitation current), but also on the instantaneous direction of rotation of the motor.

The invention also relates to a data processing apparatus comprising display and a data input device according to the foregoing.

Various other aspects of the invention are recited in dependent claims.

BRIEF DESCRIPTION OF THE DRAWINGS

For a fuller understanding of the invention, reference is had to the following description taken in connection with the following drawings, in which.

DETAILED DESCRIPTION OF A PREFERRED EMBODIMENT

Figure 1:
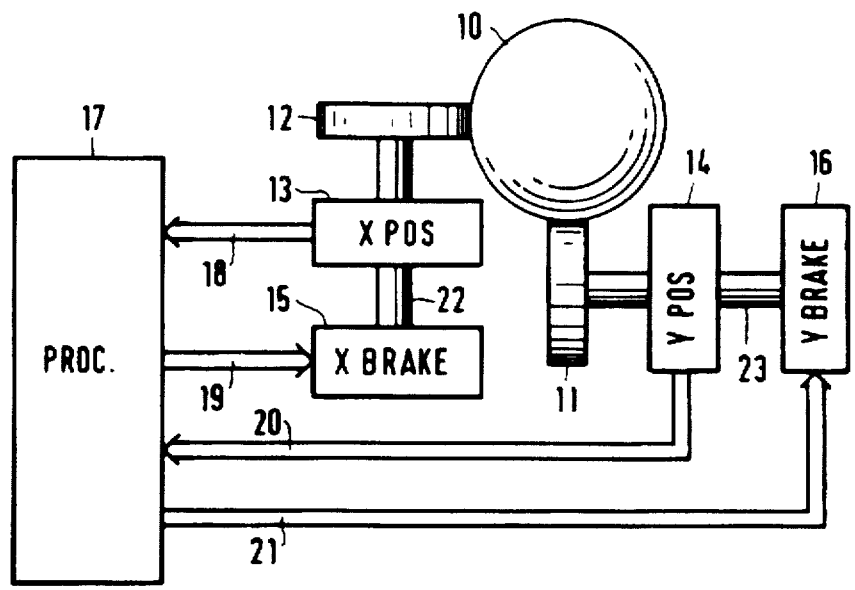
FIG. 1 shows a prior art device.

FIG. 1 shows a prior art device. The device comprises a rotationally-symmetrical member (sphere) 10 whereto wheels 11 and 12 are mechanically coupled by friction. A shaft 23 is attached to the wheel 11 and a position sensor (YPOS) 14 and a brake (YBRAKE) 16 are coupled to the shaft. The position sensor 14 is connected, via a data line 20, to a processor 17 in order to supply the processor with a y coordinate of the sphere 10. It is also possible to supply the processor 17 with a time-variation quantity of the y coordinate instead of the absolute y coordinate. The brake 16 is connected, via a data line 21, to the processor 17 so that the brake 16 can be controlled by the processor. To the wheel 12 there is attached a shaft 22 whereto a position sensor (XPOS) 13 and a brake (XBRAKE) 15 are coupled. Via a data line 18, the position sensor 13 is also connected to the processor 17 in order to supply the processor with in this case the x coordinate or a time-variation of the x coordinate of the sphere 10. The brake 15 is connected to the processor 17 via a data line 19 so that the brake 15 can also be controlled by the processor. As alternative to the construction shown, various other realizations have been in use that would also lend themselves for applying the improvements of the present invention.

The data lines 18 to 21 are in principle capable of carrying analog or digital signals. The coupling to the processor 17 will usually be digital, so that the processor 17 or the position sensors 13 and 14 and the brakes 15 and 16 could comprise analog-to-digital (A/D) converters or digital-to-analog (D/A) converters should the components 13, 14, 15 and 16 operate on an analog basis. For brevity, the internal structure of the processor and the attached display have not been shown. Also, the housing of the device, that could make it a trackball device (sphere on its upper side extending slightly) or, alternatively, a mouse device (sphere slightly extending on the lower side for being brought in frictional contact with a surface) is not shown for brevity.

The device shown in FIG. 1 operates as follows. During a rotation of the sphere, either the wheel 11 or the wheel 12 or the wheel 11 as well as the wheel 12 will also rotate due to the friction between the wheels and the sphere. A rotary motion of one of the shafts 22 and 23 is detected by the position sensors 13 and 14, respectively, and applied to the processor 17. On the basis of this data the processor can determine the position of the sphere and, on the basis thereof, it can determine whether the brakes 14 and/or 15 are capable of exerting a braking effect on the sphere when the sphere is in motion. In the rest state of the sphere, the frictional force will be equal (and hence proportional) to any operator force exerted on the sphere. This is a substantial drawback of such a device because, when the sphere is actually in an xy position which is undesirable, the operator receives a frictional force feedback only if the sphere is in motion.

Figure 2:
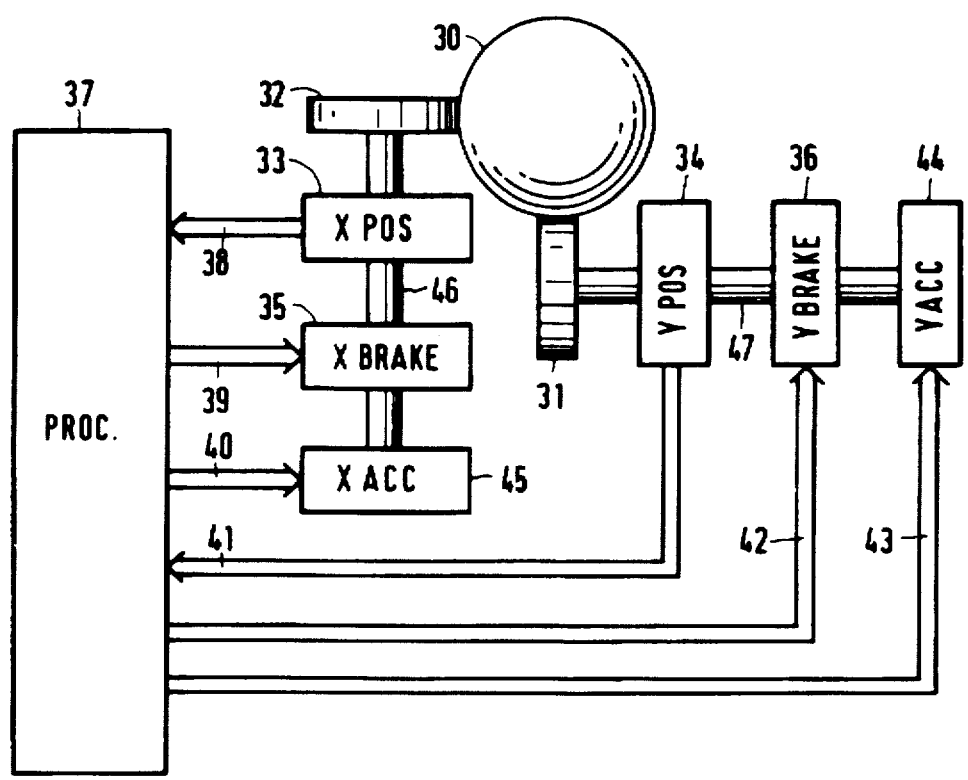
FIG. 2 shows a first embodiment of a device in accordance with the invention.

FIG. 2 shows an embodiment of a device in accordance with the invention. The device comprises a number of components which correspond to components of the device shown in FIG. 1, i.e a sphere 30, wheels 31 and 32, position sensors 33 and 34, brakes 35 and 36, a processor 37, shafts 46 and 47, and data lines 38, 39, 41 and 42. In accordance with the invention, the device shown in FIG. 2 also comprises the accelerator means 45 (XACC) and 44 (YACC) and the data lines 40 and 43. Under the control of the processor 17, the shaft 46 and/or 47 can be accelerated by excitation of the components 45 and/or 44. This means that a force can be exerted on the sphere also during standstill of the sphere. As a result, the operator of the device may experience a distinct force feedback also in the rest state of the sphere. It is even possible for the sphere from the rest state to start rotating in a predetermined direction after having been released by the operator. Such a mechanical feedback by means of a brake and an accelerator, therefore, is not only passive as the device in FIG. 1, but also active. As a result, an operator of a device will receive a substantially improved mechanical feedback so that the total feedback, determined by the feedback via the display screen and the mechanical feedback to the operator, will also be improved.

Figure 3:
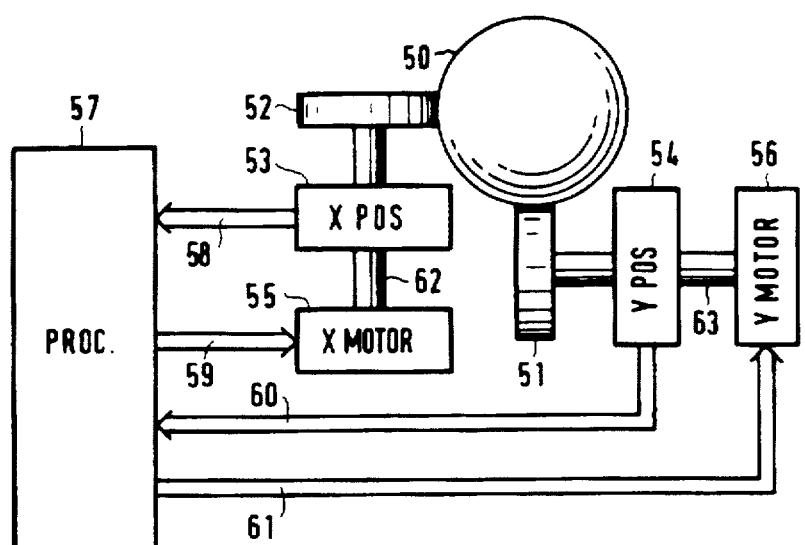
FIG. 3 shows a further embodiment of a device in accordance with the invention.

FIG. 3 shows a further embodiment of a device in accordance with the invention. The device comprises a number of components which correspond to components of the device shown in FIG. 2, i.e. a sphere 50, wheels 51 and 52, position sensors 53 and 54, a processor 57, shafts 62 and 63, and data lines 58 and 60. The device shown in FIG. 3, however, differs from the device shown in FIG. 2 in that the functions of the brake 35 (XBRAKE) and the accelerator 45 (XACC) and the brake 36 (YBRAKE) and the accelerator means 44 (YACC) are taken over by the motor 55 (XMOTOR) and the motor 56 (YMOTOR), respectively. The motors 55 and 56 are controlled by the processor 57 via the data lines 59 and 61, respectively. Control via these data lines for the relevant motor 55 or 56 may imply on the one hand that the relevant motor is braked, but may also imply that the relevant motor is accelerated. Thus, both braking and accelerating can be implemented by a single component 55 (XMOTOR) or 56 (YMOTOR), respectively.

In the above FIGS. 1 to 3 a sphere is shown as an example of a rotationally-symmetrical member. The sphere allows for motion in two directions, i.e. an x-direction and a y-direction perpendicular thereto. However, it is also possible to choose a cylinder instead of a sphere. Contrary to a sphere, a cylinder has only one degree of freedom, i.e. a variation is possible exclusively in the x-direction or exclusively in the y-direction. This may suffice for given applications. A cylinder offers the advantage that only a single position sensor, a single brake and a single acceleration element are required, the latter two being again combinable in a single element. Moreover, no coupling wheel would be necessary inasmuch as the cylinder could be mounted directly on an axis.

Figure 4:
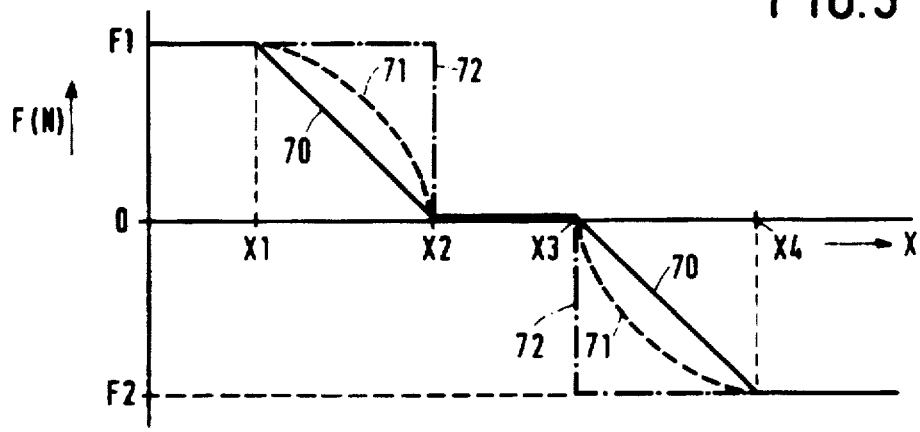
FIG. 4 shows a diagram in accordance with the invention in which the acceleration force is shown as a function of a position coordinate.

FIG. 4 shows a diagram in accordance with the invention illustrating the acceleration force as a function of a position coordinate (x). For simplicity, this example concerns only the x-coordinate, but a control may also be present for the y-direction. The x-coordinate is plotted in the horizontal direction and the force acting on the sphere in the device shown in the FIGS. 2 and 3 is plotted in the vertical direction. As appears from the Figure, no force acts on the sphere in the x-path between X2 and X3. In practice this may mean that the sphere is positioned in a desirable area, which can be interpreted as the cursor being situated in a desired position on the image display screen or within a desired position area. Along the path between X1 and X2 the sphere experiences an acceleration force which may vary according to the curves 70, 71 or 72.

The shape of the curves is merely given by way of example and it will be evident that in principle any other shape is feasible because this task is performed by the processor. Such shapes could therefore be according to a straight line, parabola, convex as well as concave curves, curves in the shape of an S, and they could even have corners so that a broken line occurs. Moreover, the amount of force exerted may be small, so as to make the user feel small preferences. Alternatively, the force may be higher, even to such a degree that particular positions would appear "forbidden".

For the three curves the acceleration force F in the x-direction x<X2 is positive and is negative in the x-direction x>X4. In the present example this means that the sphere experiences a positive force which is directed in the positive x-direction when the sphere is situated in the x-path to the left from X2. The sphere thus experiences an accelerating force. The maximum force amounts to F1 and can be determined as desired or as can be technically simply realised.

The sphere experiences a force directed in the negative x-direction if the sphere is situated in the x-path to the right of X3. This means that the sphere is braked during motion to the right and that it is pushed back when in the rest state. The maximum negative force amounts to F2. This value can again be adjusted as desired.

It would be obvious that integrating the x-dependent force shown in FIG. 4 with respect to the x-coordinate produces an x-dependent potential field. Such potential field may also be two-dimensional. It may be static or time-dependent as determined by computer control. In other situations, the force cannot be described as being governed by a single potential field, for example, in that it is controlled by actual cursor velocity, or by a history of the cursor movement, hysteresis, etcetera.

Figure 5:
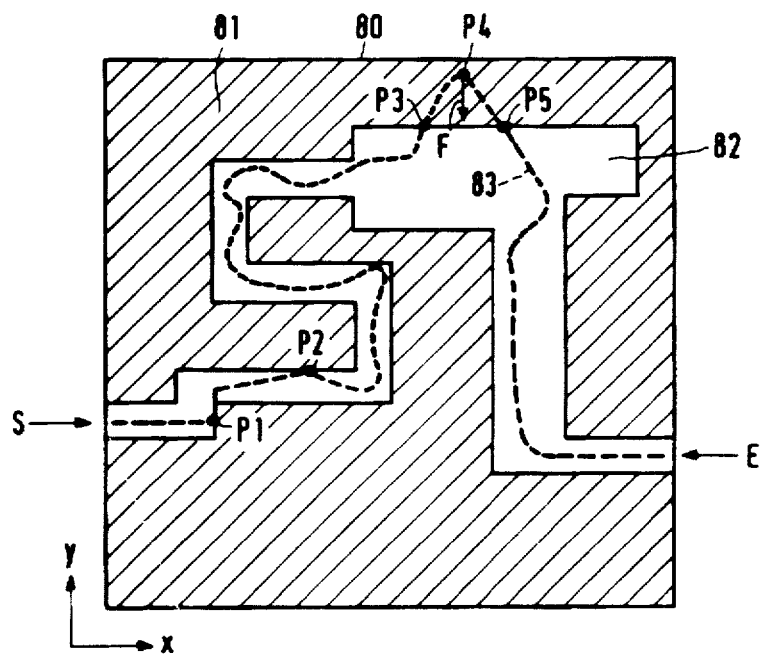
FIG. 5 shows an example of an image on a display screen, together with a path along which the member of the device will experience more or less force.

FIG. 5 shows an example of an image 80 on a display screen, together with paths along which the member of the device will experience more or less force. The shaded area 81 is an area in which the presence of the cursor (sphere) is not desired, i.e. when the sphere is present in the area 81 it will experience a force in the direction of the area 82. The area 82 is an area in which the presence of the sphere is desired, i.e. the cursor (sphere) will not experience a force in this area. For simplicity, the force exerted on the device is determined only by the position where the cursor leaves the area 82 and then remains constant so as to push the cursor back, in either one of the +x, −x, +y, −y, directions, respectively. In a more complicated set-up, the force derives from a potential field, the potential generally increasing with the distance to the desired area.

By way of example, a start is made at S. As an indication for the x and y position of the sphere a cursor can be displayed on the image 80. Thus, the operator receives a visual feedback as regards the actual x and y position of the member (the sphere). The cursor can have any reasonable shape, for example an arrow or a dash. Now, the cursor is moved in the positive x-direction until it reaches the point P1. Along this path the sphere of the device will not experience an opposing (braking) or stimulating (accelerating) force, because the cursor (and hence also the sphere) is situated in the desired area. At the point P1 the sphere will experience an opposing force if the operator attempts to move the sphere (cursor) beyond the point P1 in the x-direction. In accordance with the invention, this opposing fee force consists not only of a braking force during movement of the sphere in the positive x-direction, but also of an accelerating force. This means that if the sphere (cursor) were to be situated to the right of P1, the sphere would experience an accelerating force in the negative x-direction.

The sphere does not experience a force along the path 83 between P1 and P2, because it moves on the desired area. When it arrives at the point P2, motion in the positive y-direction will be impeded on the one hand by a braking force from the brake during motion of the sphere in the positive y-direction, and on the one hand by an accelerating force in the negative y-direction.

Along the path 83 between the points P2 and P3 the sphere will not experience any force either.

Furthermore, there is shown the case when the operator has the cursor leave the desired area at point P3. All along the trajectory between points P3 and P5, there is effected an accelerating force in the negative y-direction, as has been symbolized at point P4 by arrow F.

At the boundary between the desired area 82 and the undesired area 81, the force increases from a value zero to a value unequal to zero. The variation of the force as a function of the x-coordinate or the y-coordinate can be as shown in FIG. 4. The point P1 in FIG. 5 then corresponds, for example to the x-coordinate X3 in FIG. 4. When the sphere is moved in the positive direction at the point P1, it will experience a force which will point in the direction of the negative x-direction as can be seen in FIG. 4 for x>X3. Alternatively, near to the border of undesired area 81 the force may increase according to one of the other curves 70 and 71 (FIG. 4).

It may also be that the braking and accelerating forces in accordance with the invention are not exclusively dependent on the instantaneous x,y position of the sphere or cursor. These forces may also be determined by the instantaneous speed of the sphere. Thus, a kind of mass or rotational inertia can be simulated; this could be useful for various applications. The control signals required can be simply generated by the processor by way of an appropriate arithmetic algorithm, because the processor can determine the position coordinates of the sphere, and also its speed in the x- and y-directions, on the basis of position sensors.

In accordance with the invention it is also possible to determine the speed of the sphere by means of additional speed sensors. Generally, a better measuring accuracy can thus be obtained.

In accordance with the invention it is also possible to provide the device with a force sensor for detecting the total force acting on the member. On the basis of this information the data processing apparatus can drive the brake and/or accelerator more or less. Because the magnitude of the drive is known, the operator force exerted by the operator can be simply deduced. On the basis of the deduced operator force it is subsequently possible to change the desired drive of the brake and/or accelerator.

To those skilled in the art it will be evident that the above example is given merely to illustrate the invention. In addition to the possibility of following a desired path, the use of the invention in accessing a menu is also feasible. The sphere (cursor) is then quasi-guided to a desired selection box.

It will also be evident that the accelerator in accordance with the invention may be adjusted so that a sphere can start its own motion from standstill when the sphere is present in an inhibited area, but in that case, the acceleration forces should be adjusted that any oscillatory motion should be damped.

The device in accordance with the invention preferably comprises a trackball. A trackball is a well-known device in which a sphere (ball) is retained in a holder. Sometimes a trackball is to be preferred over a so-called mouse, notably when the available desk surface is only limited, because the mouse need be moved across a surface. A trackball, however, occupies a steady position and can also be integrated, for example in a keyboard. When a trackball is used the operator often experiences difficulty in drawing straight lines on the display screen by rotation of the sphere. This is because the drawing of a straight line implies linear driving of the sphere. In practice, however, a trackball is usually loosely operated by the operator, the wrist of the operator's hand resting on a solid base, for example a desk top. Motions of the operator's hand or fingers, however, do not describe a straight line in such cases but rather an approximation of a circular curve. In such circumstances, the invention could be used by making horizontal motion on the screen preferred to vertical motion, for so allowing easy pointing to successive words on a single line of text. This would mean that each line of text has a preferred area in the form of a narrow strip. Contiguous lines are separated by strips of undesired area that would cost some extra force to traverse. The magnitude of such force could be made adjustable. Also, the processor itself could assign those preferred/undesired strips exclusively to filled text area. Various other layouts of preferred/undesired areas would be feasible. They could also be shown to a user by appropriate shading or colours.

We claim:

1. A data input device for transmitting a position signal to a data processing apparatus, the device comprising:

a housing including a physical member having at least one axis and rotationally manipulatable in at least a first direction and a second direction opposite the first direction about the at least one axis;

sensing means responsive to a position of the physical member for transmitting the position signal to a data processing apparatus; and control means responsive to a control signal generated by a data processing apparatus for applying a braking force and an accelerating force to the physical member in at least one of the first direction and the second direction.

2. A device as claimed in claim 1, wherein said acceleration is at least partially determined by an actual velocity of said rotational manipulation.

3. A device as claimed in claim 1, wherein said physical member is spherical.

4. A device as claimed in claim 1, wherein said sensing means allow for detecting an actual total force on said member in at least one coordinate direction.

5. A device as claimed in claim 1, wherein said sensing means allow for detecting an instantaneous velocity of said member with respect to the housing.

6. A device as claimed in claim 1, wherein said acceleration is multivalued.

7. A device as claimed in claim 1, provided with assigning means for assigning to the member a predetermined virtual rotational inertia.

8. A device as claimed in claim 1, realized as a trackball device.

9. A device as claimed in claim 1, realized as a mouse device.

10. A device as claimed in claim 1, wherein the control means includes at least one electromechanical motor.

11. A device as claimed in claim 1, wherein said control means generates deceleration of the physical member.

12. The device as claimed in claim 1, wherein said physical member is a joystick.

13. A data processing apparatus comprising a data input device, wherein the data input device comprises:

a housing including a physical member having at least one axis and rotationally manipulatable in at least a first direction and a second direction opposite the first direction about the at least one axis;

sensing means responsive to a position of the physical member for transmitting a position signal to the data processing apparatus; and control means responsive to a control signal generated by said data processing apparatus for applying a braking force and an accelerating force to the physical member in at least one of the first direction and the second direction.

14. An apparatus as claimed in claim 13, further including display means and wherein he position signal is represented by a display indicium of the display mean and wherein the acceleration is controlled by a movement of the display indicium.

15. A device as claimed in claim 14, wherein said acceleration is derived from a potential field mapped on said display means.

16. A device as claimed in claim 13, wherein said control means generates deceleration of the physical member.

17. A data input device for providing tactile feedback to a user, the device comprising:
   a physical member having at least one axis and rotationally manipulatable in at least a first direction and a second direction opposite the first direction about the at least one axis;
   sensing means responsive to a position of the physical member for transmitting a position signal to a data processing apparatus; and
   control means responsive to a control signal generated by a data processing apparatus for providing tactile feedback to the user by generating at least acceleration of the physical member so as to increase the velocity of the physical member in at least one of the first direction and the second direction.

18. The device as claimed in claim 17, wherein said control signal is responsive to said position signal.

19. The device as claimed in claim 17, wherein said physical member is a joystick.

20. A data input device for use with a data processing apparatus, the device comprising: a physical member having at least one axis and movable in at least a first direction and a second direction opposite the first direction about the at least one axis; means for transmitting a signal corresponding to a position of the physical member to a data processing apparatus; and means responsive to a data processing apparatus for applying a braking force and an accelerating force to the physical member in at least one of the first direction and the second direction.

21. The device as claimed in claim 20, wherein said physical member is a joystick.

22. The device as claimed in claim 20, wherein said physical member is a trackball.

23. The device as claimed in claim 20, wherein said physical member is a mouse.

24. The device as claimed in claim 20, wherein said physical member is a cylinder.

25. A data input device for use with a data processing apparatus, the device comprising: a physical member having at least one axis and movable in at least a first direction and a second direction opposite the first direction about the at least one axis; means for transmitting a signal corresponding to a speed of the physical member to a data processing apparatus; and means responsive to a data processing apparatus for applying a braking force and an accelerating force to the physical member in at least one of the first direction and the second direction.

26. The device as claimed in claim 25, wherein said physical member is a joystick.

27. A data input device for use with a data processing apparatus, the device comprising: a physical member having at least one axis and moveable in at least a first direction and a second direction opposite the first direction about the at least one axis; means for transmitting a signal corresponding to a force acting on the physical member to a data processing apparatus; and means responsive to said data processing apparatus for applying a braking force and an accelerating force to the physical member in at least one of the first direction and the second direction.

28. The device as claimed in claim 27, wherein said physical member is a joystick.

29. A data input device, the data input device comprising: a housing including a physical member movable about at least a first axis in a first direction and a second direction and about a second axis in a second first direction and a second direction; means for transmitting a signal corresponding to a position of the physical member to a data processing apparatus; and control means responsive to a control signal generated by said data processing apparatus for generating at least acceleration of the physical member so as to increase the velocity of the physical member in at least one of said first first direction, first second direction, second first direction and second second direction.

* * * * *